(12) United States Patent
Wolf (10) Patent No.: US 10,530,676 B2
(45) Date of Patent: Jan. 7, 2020

(54) DISTRIBUTED POWER REMOTE COMMUNICATION STATUS SYSTEM AND METHOD

(71) Applicant: Westinghouse Air Brake Technologies Corporation, Wilmerding, PA (US)

(72) Inventor: Charles L Wolf, Olney, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 179 days.

(21) Appl. No.: 15/073,929

(22) Filed: Mar. 18, 2016

(65) Prior Publication Data
US 2017/0272351 A1 Sep. 21, 2017

(51) Int. Cl.
| H04L 12/26 | (2006.01) |
| H04L 29/08 | (2006.01) |
| B61L 3/00 | (2006.01) |
| B61L 15/00 | (2006.01) |

(52) U.S. Cl.
CPC ............. *H04L 43/50* (2013.01); *B61L 3/008* (2013.01); *B61L 15/00* (2013.01); *B61L 15/0027* (2013.01); *B61L 15/0036* (2013.01); *H04L 67/12* (2013.01); *H04L 67/125* (2013.01)

(58) Field of Classification Search
CPC ................................ H04L 67/12; H04L 43/50
USPC .......................... 709/224, 217, 219; 370/252
See application file for complete search history.

(56) References Cited

U.S. PATENT DOCUMENTS

| 4,582,280 | A | 4/1986 | Nichols et al. |
| 5,039,038 | A | 8/1991 | Nichols et al. |
| 5,681,015 | A | 10/1997 | Kull |
| 5,720,455 | A | 2/1998 | Kull et al. |
| 6,400,281 | B1 | 6/2002 | Darby, Jr. et al. |
| 6,401,015 | B1 | 6/2002 | Stewart et al. |
| 6,443,538 | B1 | 9/2002 | Smith, Jr. et al. |
| 6,691,957 | B2 | 2/2004 | Hess, Jr. et al. |
| 6,759,951 | B2 | 7/2004 | Kellner et al. |
| 6,867,708 | B2 | 3/2005 | Darby, Jr. et al. |
| 6,922,619 | B2 | 7/2005 | Baig et al. |
| 7,038,597 | B2 | 5/2006 | Smith |
| 7,263,647 | B2 | 8/2007 | Bryant et al. |
| 7,346,699 | B1 | 3/2008 | Krause et al. |
| 7,762,631 | B2 | 7/2010 | Smith |
| 7,873,450 | B2 | 1/2011 | Lawry et al. |
| 8,073,582 | B2 | 12/2011 | Kellner et al. |
| 8,112,191 | B2 | 2/2012 | Kumar et al. |
| 8,190,311 | B2 | 5/2012 | Smith |
| 8,190,315 | B2 | 5/2012 | Kraeling et al. |
| 8,224,237 | B2 | 7/2012 | Smith, Jr. et al. |
| 8,280,566 | B2 | 10/2012 | Foy, III et al. |
| 8,295,998 | B2 | 10/2012 | Goodermuth et al. |
| 8,328,144 | B2 | 12/2012 | Smith |
| 8,328,145 | B2 | 12/2012 | Smith |
| 8,380,413 | B2 | 2/2013 | Smith et al. |
| 8,406,941 | B2 | 3/2013 | Smith |

(Continued)

*Primary Examiner* — Thuong Nguyen
(74) *Attorney, Agent, or Firm* — Christopher R. Carroll; The Small Patent Law Group LLC (57) ABSTRACT

A computer-implemented method for determining at a lead locomotive in a train consist a communications status of at least one remote locomotive of a plurality of remote locomotives of the train consist, and a system for determining, at a lead locomotive in a train consist, a communications status of at least one remote locomotive of the train consist.

27 Claims, 4 Drawing Sheets

(56) References Cited

U.S. PATENT DOCUMENTS

| | | | |
|---|---|---|---|
| 8,428,798 B2 | 4/2013 | Kull | |
| 8,510,026 B2 | 8/2013 | Desanzo et al. | |
| 8,589,003 B2 | 11/2013 | Brand et al. | |
| 8,620,552 B2 | 12/2013 | DeSanzo et al. | |
| 9,026,038 B2 | 5/2015 | Mason et al. | |
| 9,114,817 B2 | 8/2015 | Kraeling et al. | |
| 2003/0125852 A1 | 7/2003 | Schade et al. | |
| 2003/0182029 A1* | 9/2003 | Horst | B61C 17/12 701/19 |
| 2006/0085103 A1* | 4/2006 | Smith, Jr. | B61L 15/0027 701/19 |
| 2007/0233335 A1* | 10/2007 | Kumar | B61L 3/006 701/22 |
| 2007/0236079 A1 | 10/2007 | Kull | |
| 2010/0235017 A1* | 9/2010 | Peltonen | B61L 15/0018 701/2 |
| 2012/0290156 A1 | 11/2012 | Woo et al. | |
| 2014/0005915 A1 | 1/2014 | Smith et al. | |
| 2014/0052315 A1* | 2/2014 | Isailovski | B61L 3/002 701/19 |
| 2014/0074327 A1* | 3/2014 | Weber | B61L 15/0063 701/19 |
| 2014/0078926 A1* | 3/2014 | Nishioka | G06F 11/0757 370/252 |
| 2015/0198712 A1 | 7/2015 | Soderi et al. | |
| 2015/0210168 A1 | 7/2015 | Pykkonen et al. | |
| 2015/0321683 A1 | 11/2015 | Kraeling et al. | |
| 2015/0360700 A1 | 12/2015 | Cooper et al. | |
| 2016/0075355 A1 | 3/2016 | Kellner et al. | |
| 2016/0107661 A1 | 4/2016 | Cooper et al. | |
| 2016/0119799 A1 | 4/2016 | Hutchins et al. | |
| 2016/0134994 A1 | 5/2016 | Kellner et al. | |
| 2016/0135154 A1 | 5/2016 | Klemanski et al. | |
| 2016/0339929 A1* | 11/2016 | Schoenly | B61L 3/006 |
| 2017/0106888 A1* | 4/2017 | Shubs, Jr. | B61L 27/0061 |
| 2017/0129513 A1* | 5/2017 | Seaton | B61L 27/04 |

* cited by examiner

DISTRIBUTED POWER REMOTE COMMUNICATION STATUS SYSTEM AND METHOD

BACKGROUND OF THE INVENTION

Field of the Invention

Preferred and non-limiting embodiments or aspects are related to a railroad distributed power communication system and method, and more particularly, to a railroad distributed power remote communication status system and method for determining whether one or more remote communication devices have received and are responsive to a command message from a lead communication device.

Description of Related Art

Communication among mobile assets, such as locomotives and other cars in a train consist, is important to ensure the coordination of various functions of the mobile assets. Functions, such as throttle control, braking, and direction, for example, are important to coordinate among locomotives during a train consist's operation. Radio frequency schemes may be used for intra-train communication within the train consist, with various combinations of communication devices and arrangements, e.g., transmitters, receivers, transceivers, and/or the like, distributed among the lead and remote locomotives.

During a distributed power operation for a train, the lead or command locomotive may transmit instructions or control information in a command message to one or more remote or controlled locomotives that are located in the back of or behind the lead locomotive within the train consist. Upon receipt of the command message, the remote locomotives may transmit a reply message to the lead locomotive, typically including the remote locomotives actual status information pertaining to the command message instructions. If the lead locomotive is satisfied that it has received a reply message from all of the remote locomotives, the lead locomotive may declare that all remotes are following the command message instructions. Alternatively, if the lead locomotive does not receive a reply message from each remote locomotive within a certain period of time, the lead locomotive may assume that communication has been lost or has failed, and that one or more of the remote locomotives is not following the command message instructions. However, it is recognized that the lead locomotive not receiving a status reply message from one or more remote locomotives does not necessarily mean that those locomotives are not following the command message instruction.

In one example, locomotive consists traverse a wide range of topographies including mountainous terrain and other areas having physical features, such as tunnels, that may cause a temporary loss of communication among locomotives in the consist. When traveling through such areas, the lead locomotive's operator may interpret the lack of a status reply message from a remote locomotive to mean that the remote locomotive did not receive the proper command message information. However, it may be the case that the lead locomotive may not have received the remote locomotive's status reply message because it was lost due to a temporary communication failure between the lead locomotive and the remote locomotive. In this respect, the remote locomotive may be following the command message instructions while the operator of the lead locomotive erroneously concludes that the remote locomotive is not following the command message instructions. This situation may cause the operator to take corrective action that could be avoided if the operator knew the remote locomotive was following the command message instructions. Therefore, rapid verification that remote locomotives have received a command message and are following command instructions allows for improved operating efficiency of the train consist.

In another example, the lead locomotive may enter into a degraded mode if it fails to receive the remote locomotive's status reply message. The degraded response may include repeating the command message to the missing remote, which generates additional radio traffic, limiting the train operation, e.g., speed limitations, or completely stopping the train. Conventionally, the lead locomotive only knows if radio communications to a remote locomotive are bi-directional, i.e., the remote locomotive has received the lead locomotive's command message, and the lead locomotive has subsequently received the remote locomotive's reply message; however, the lead locomotive is unaware if radio communications to the remote locomotive are working in only one direction, e.g., due to a poor line-of-sight or other radio signal degradation. That is, the lead locomotive is not capable of knowing that the remote locomotive has received the lead locomotive's command message, but that the remote locomotive's reply message has been lost.

SUMMARY OF THE INVENTION

Generally, provided is an improved railroad distributed power remote communication status system and method for use in a railway system. Preferably, provided are a railroad distributed power remote communication status system and method that enable a lead locomotive to recognize a one-way communications loss from one or more remote locomotives, and to respond to the one-way communications loss in a less restrictive manner. Preferably, provided are a railroad distributed power remote communication status system and method for reducing train stoppages and providing more efficient distributed power train performance in areas where radio communications are poor or degraded. Preferably, provided are a railroad distributed power remote communication status system and method that enable a lead locomotive to know if each of the remote locomotives have received the lead locomotive's command messages (either directly or indirectly) without requiring new and/or separate radio messages to support notifying the lead locomotive. Preferably provided are a railroad distributed power remote communication status system and method that provide a new field in each remote locomotive's reply message that provides the communications status of other remote locatives in the consist while maintaining a relatively small reply message data size.

Accordingly, and in one preferred and non-limiting embodiment or aspect, provided is a computer-implemented method for determining at a lead locomotive in a train consist a communications status of at least one remote locomotive of a plurality of remote locomotives of the train consist, the method comprising: (a) transmitting, by a lead communication device of the lead locomotive, a command message; (b) receiving, by a plurality of communication devices of a respective plurality of remote locomotives, the command message; (c) transmitting, by a communication device of at least one remote locomotive of the plurality of remote locomotives, a status reply message; (d) receiving, by a communication device of at least one other remote locomotive of the plurality of remote locomotives, the status reply message; (e) incrementing, at the at least one other remote locomotive of the plurality of remote locomotives, a current status reply count based on the status reply message of the at least one remote locomotive of the plurality of remote locomotives; and (f) transmitting, by the communication device of the at least one other remote locomotive of the plurality of remote locomotives, an expanded status reply message including the current status reply count.

In one preferred and non-limiting embodiment or aspect, the transmitting step (f) comprises transmitting the expanded status reply message to the lead communication device of the lead locomotive. In another preferred and non-limiting embodiment or aspect, the method further comprises: receiving, by the lead communication device of the lead locomotive, the expanded status reply message; and determining, by an on-board processor of the lead locomotive, a communications status of a communication device of the at least one remote locomotive, based at least partly on the current status reply count in the expanded status reply message.

In another preferred and non-limiting embodiment or aspect, included are two or more communication devices of a respective two or more remote locomotives, the method further comprising: receiving, by the two or more communication devices of a respective two or more remote locomotives, the command message; transmitting, by the two or more communication devices of a respective two or more remote locomotives, a respective status reply message; receiving, by the communication device of the at least one other remote locomotive, each respective status reply message; and incrementing, at the at least one other remote locomotive, the current status reply count based on each respective status reply message. In one preferred and non-limiting embodiment or aspect, the method further comprises: receiving, by the lead communication device, the second status reply message; and determining, by an on-board processor of the lead locomotive, whether the respective status reply message from each of the two or more communication devices of a respective two or more remote locomotives has been received by the lead communication device. In one preferred and non-limiting embodiment or aspect, the determination is based at least partly on a number of status reply messages received by the lead communication device of the lead locomotive. In one preferred and non-limiting embodiment or aspect, the method further comprises returning, by the lead communication device, to a normal lead communication device transmit sequence if the lead communication device has received the respective status reply message from each of the two or more communication devices of a respective two or more remote locomotives and the expanded status reply message from the communication device of the at least one other remote locomotive. In one preferred and non-limiting embodiment or aspect, the method further comprises: (i) determining, by the on-board processor of the lead locomotive, that the lead communication device has not received the respective status reply message directly from at least one of the two or more communication devices of a respective two or more remote locomotives; and (ii) determining, by the on-board processor of the lead locomotive, a communications status of at least one of the two or more communication devices of a respective two or more remote locomotives based at least partly on the current status reply count in the expanded status reply message.

In one preferred and non-limiting embodiment or aspect, the method further comprises delaying, for a period of time, before determining the communication status of the at least one of the two or more communication devices of a respective two or more remote locomotives. In one preferred and non-limiting embodiment or aspect, the method further comprises: determining, by the on-board processor of the lead locomotive, whether the at least one of the two or more communication devices of a respective two or more remote locomotives has received the command message; and transmitting, by the lead communication device, the command message until the on-board processor of the lead locomotive determines that each of the two or more communication devices of a respective two or more remote locomotives has received the command message. In one preferred and non-limiting embodiment or aspect, the method further comprises determining, by the on-board processor of the lead locomotive, whether the at least one of the two or more communication devices of a respective two or more remote locomotives has received the command message; and returning to a normal lead communication transmit sequence when the on-board processor of the lead locomotive determines that each of the two or more communication devices of a respective two or more remote locomotives has received the command message. In some preferred and non-limiting embodiments or aspects, the method further comprises generating or providing, by the on-board processor of the lead locomotive, an output to an operator of the lead locomotive indicating one of the following: i) receipt of the command message by each of the two or more communication devices of a respective two or more remote locomotives is confirmed or ii) receipt of the command message by one or more of the two or more remote communication devices of a respective two or more remote locomotives cannot be confirmed.

In another preferred and non-limiting embodiment or aspect, the method further comprises: repeating, by the communication device of the at least one other remote locomotive, the command message; and determining, by an on-board processor of the at least one other remote locomotive, whether the received command message is the command message transmitted by the lead communication device or the command message has been repeated by a communication device of another remote locomotive.

In one preferred and non-limiting embodiment, the method further comprises determining, by the on-board processor of the at least one other remote locomotive, whether the received command message is a new command message or a previously received command message.

In a further preferred and non-limiting embodiment or aspect, provided is a system for determining, at a lead locomotive in a train consist, a communications status of at least one remote locomotive of the train consist, the system comprising: a lead communication device of the lead locomotive programmed or configured to transmit a command message; a communication device of at least one remote locomotive of a plurality of remote locomotives programmed or configured to receive the command message and transmit a status reply message; a communication device of at least one other remote locomotive of the plurality of remote locomotives programmed or configured to receive the status reply message; and an on-board processor of the at least one other remote locomotive of the plurality of remote locomotives programmed or configured to increment a current status reply count based on the status reply message; wherein the communication device of the at least one other remote locomotive of the plurality of remote locomotives is programmed or configured to transmit an expanded status reply message including the current status reply count.

In one preferred and non-limiting embodiment or aspect, the expanded status reply message is transmitted to the lead communication device of the lead locomotive. In one preferred and non-limiting embodiment or aspect, the lead communication device of the lead locomotive is programmed or configured to receive the expanded status reply message, the system further comprising an on-board processor of the lead locomotive programmed or configured to determine a communications status of a communication device of the at least one remote locomotive based at least partly on the current status reply count in the expanded status reply message. In one preferred and non-limiting embodiment or aspect, the system comprises two or more communication devices of a respective two or more remote locomotives programmed or configured to receive the command message and transmit a respective status reply message; wherein the communication device of the at least one other remote locomotive is programmed or configured to receive each respective status reply message; and wherein the on-board processor of the at least one other remote locomotive is programmed or configured to increment the current status reply count based on each respective status replay message. In one preferred and non-limiting embodiment or aspect, the lead communication device of the lead locomotive is programmed or configured to receive the expanded status reply message, the system further comprising an on-board processor of the lead locomotive programmed or configured to determine whether the respective status reply message from each of the two or more communication devices of a respective two or more remote locomotives has been received by the lead communication device. In one preferred and non-limiting embodiment or aspect, the determination is based at least partly on a number of status reply messages received by the lead communication device of the lead locomotive. In one preferred and non-limiting embodiment or aspect, the lead communication device is programmed or configured to return to a normal lead communication device transmit sequence if the lead communication device has received the respective status reply message from each of the two or more communication devices of a respective two or more remote locomotives and the expanded status reply message from the communication device of the at least one other remote locomotive.

In another preferred and non-limiting embodiment or aspect, the on-board processor of the lead locomotive is further programmed or configured to: (i) determine that the lead communication device has not received the respective status reply message from at least one of the two or more communication devices of a respective two or more remote locomotives; and (ii) determine a communications status of at least one of the two or more communication devices of a respective two or more remote locomotives based at least partly on the current status reply count in the expanded status reply message. In one preferred and non-limiting embodiment or aspect, the on-board processor of the lead locomotive is programmed or configured to delay, for a period of time, before determining the communication status of the at least one of the two or more communication devices of a respective two or more remote locomotives. In one preferred and non-limiting embodiment or aspect, the on-board processor of the lead locomotive is programmed or configured to determine whether at least one of the two or more communication devices of a respective two or more remote locomotives has received the command message, and wherein the lead communication device is programmed or configured to transmit the command message until the on-board processor of the lead locomotive determines that each of the two or more communication devices of a respective two or more remote locomotives has received the command message. In one preferred and non-limiting embodiment or aspect, the on-board processor of the lead locomotive is programmed or configured to determine whether at least one of the two or more communication devices of a respective two or more remote locomotives has received the command message; and the lead communication device is programmed or configured to return to a normal lead communication transmit sequence when the on-board processor of the lead locomotive determines that each of the two or more communication devices of a respective two or more remote locomotives has received the command message.

In another preferred and non-limiting embodiment or aspect, the communication device of the at least one other remote locomotive is programmed or configured to repeat the command message; and the on-board processor of the at least one other remote locomotive is programmed or configured to determine whether the received command message is the command message transmitted by the lead communication device or the command message has been repeated by a communication device of another remote locomotive.

In one preferred and non-limiting embodiment or aspect, the on-board processor of the at least one other remote locomotive is programmed or configured to determine whether the received command message is a new command message or a previously received command message.

In a preferred and non-limiting embodiment or aspect, the on-board processor of the lead locomotive is programmed or configured to provide an output to an operator of the lead locomotive indicating one of the following: i) receipt of the command message by each of the two or more communication devices of a respective two or more remote locomotives is confirmed or ii) receipt of the command message by one or more of the two or more remote communication devices of a respective two or more remote locomotives cannot be confirmed. In another preferred and non-limiting embodiment or aspect, an event recorder in at least one of the lead locomotive and the at least one other remote locomotive is provided and programmed or configured to store the current status reply count. In one preferred and non-limiting embodiment or aspect, at least one of the on-board processor of the at least one other remote locomotive and an on-board processor of the lead locomotive is programmed or configured to determine a problem in a communication network of the train consist based on the current status reply count. In another preferred and non-limiting embodiment or aspect, at least one of the on-board processor of the at least one other remote locomotive and an on-board processor of the lead locomotive is programmed or configured to determine a location of at least one of the at least one other remote locomotive and the lead locomotive based on the current status reply count.

Preferred and non-limiting embodiments or aspects of the present invention will now be described in the following numbered clauses:

Clause 1. A computer-implemented method for determining at a lead locomotive in a train consist a communications status of at least one remote locomotive of a plurality of remote locomotives of the train consist, the method comprising: (a) transmitting, by a lead communication device of the lead locomotive, a command message; (b) receiving, by a plurality of communication devices of a respective plurality of remote locomotives, the command message; (c) transmitting, by a communication device of at least one remote locomotive of the plurality of remote locomotives, a status reply message; (d) receiving, by a communication device of at least one other remote locomotive of the plurality of remote locomotives, the status reply message; (e) incrementing, at the at least one other remote locomotive of the plurality of remote locomotives, a current status reply count based on the status reply message of the at least one remote locomotive of the plurality of remote locomotives; and (f) transmitting, by the communication device of the at least one other remote locomotive of the plurality of remote locomotives, an expanded status reply message including the current status reply count.

Clause 2. The method according to clause 1, wherein the transmitting step (f) comprises transmitting the expanded status reply message to the lead communication device of the lead locomotive.

Clause 3. The method according to clause 1 or 2, further comprising: receiving, by the lead communication device of the lead locomotive, the expanded status reply message; and determining, by an on-board processor of the lead locomotive, a communications status of a communication device of the at least one remote locomotive, based at least partly on the current status reply count in the expanded status reply message.

Clause 4. The method according to any of clauses 1-3, further comprising two or more communication devices of a respective two or more remote locomotives, the method further comprising: receiving, by the two or more communication devices of a respective two or more remote locomotives, the command message; transmitting, by the two or more communication devices of a respective two or more remote locomotives, a respective status reply message; receiving, by the communication device of the at least one other remote locomotive, each respective status reply message; and incrementing, at the at least one other remote locomotive, the current status reply count based on each respective status reply message.

Clause 5. The method according to any of clauses 1-4, further comprising: receiving, by the lead communication device, the expanded status reply message; and determining, by an on-board processor of the lead locomotive, whether the respective status reply message from each of the two or more communication devices of a respective two or more remote locomotives has been received by the lead communication device.

Clause 6. The method according to any of clauses 1-5, wherein the determination is based at least partly on a number of status reply messages received by the lead communication device of the lead locomotive.

Clause 7. The method according to any of clauses 1-6, further comprising returning, by the lead communication device, to a normal lead communication device transmit sequence if the lead communication device has received the respective status reply message from each of the two or more communication devices of a respective two or more remote locomotives and the expanded status reply message from the communication device of the at least one other remote locomotive.

Clause 8. The method according to any of clauses 1-7, further comprising: (i) determining, by the on-board processor of the lead locomotive, that the lead communication device has not received the respective status reply message directly from at least one of the two or more communication devices of a respective two or more remote locomotives; and (ii) determining, by the on-board processor of the lead locomotive, a communications status of at least one of the two or more communication devices of a respective two or more remote locomotives based at least partly on the current status reply count in the expanded status reply message.

Clause 9. The method according to any of clauses 1-8, further comprising delaying, for a period of time, before determining the communication status of the at least one of the two or more communication devices of a respective two or more remote locomotives.

Clause 10. The method according to any of clauses 1-9, further comprising: determining, by the on-board processor of the lead locomotive, whether the at least one of the two or more communication devices of a respective two or more remote locomotives has received the command message; and transmitting, by the lead communication device, the command message until the on-board processor of the lead locomotive determines that each of the two or more communication devices of a respective two or more remote locomotives has received the command message.

Clause 11. The method according to any of clauses 1-10, further comprising: determining, by the on-board processor of the lead locomotive, whether the at least one of the two or more communication devices of a respective two or more remote locomotives has received the command message; and returning to a normal lead communication transmit sequence when the on-board processor of the lead locomotive determines that each of the two or more communication devices of a respective two or more remote locomotives has received the command message.

Clause 12. The method according to any of clauses 1-11, further comprising: determining, by the on-board processor of the lead locomotive, whether the at least one of the two or more communication devices of a respective two or more remote locomotives has received the command message; and generating or providing, by the on-board processor of the lead locomotive an output to an operator of the lead locomotive indicating one of the following: i) receipt of the command message by each of the two or more communication devices of a respective two or more remote locomotives is confirmed or ii) receipt of the command message by one or more of the two or more remote communication devices of a respective two or more remote locomotives cannot be confirmed.

Clause 13. The method according to any of clauses 1-12, further comprising: repeating, by the communication device of the at least one other remote locomotive, the command message; and determining, by an on-board processor of the at least one other remote locomotive, whether the received command message is the command message transmitted by the lead communication device or the command message has been repeated by a communication device of another remote locomotive.

Clause 14. The method according to any of clauses 1-13, further comprising determining, by the on-board processor of the at least one other remote locomotive, whether the received command message is a new command message or a previously received command message.

Clause 15. A system for determining, at a lead locomotive in a train consist, a communications status of at least one remote locomotive of the train consist, the system comprising: a lead communication device of the lead locomotive programmed or configured to transmit a command message; a communication device of at least one remote locomotive of a plurality of remote locomotives programmed or configured to receive the command message and transmit a status reply message; a communication device of at least one other remote locomotive of the plurality of remote locomotives programmed or configured to receive the status reply message; and an on-board processor of the at least one other remote locomotive of the plurality of remote locomotives programmed or configured to increment a current status reply count based on the status reply message; wherein the communication device of the at least one other remote locomotive of the plurality of remote locomotives is programmed or configured to transmit an expanded status reply message including the current status reply count.

Clause 16. The system according to clause 15, wherein the expanded status reply message is transmitted to the lead communication device of the lead locomotive.

Clause 17. The system according to clause 15 or clause 16, wherein the lead communication device of the lead locomotive is programmed or configured to receive the expanded status reply message, the system further comprising an on-board processor of the lead locomotive programmed or configured to determine a communications status of a communication device of the at least one remote locomotive based at least partly on the current status reply count in the expanded status reply message.

Clause 18. The system according to any of clauses 15-17, further comprising two or more communication devices of a respective two or more remote locomotives programmed or configured to receive the command message and transmit a respective status reply message; wherein the communication device of the at least one other remote locomotive is programmed or configured to receive each respective status reply message; and wherein the on-board processor of the at least one other remote locomotive is programmed or configured to increment the current status reply count based on each respective status replay message.

Clause 19. The system according to any of clauses 15-18, wherein the lead communication device of the lead locomotive is programmed or configured to receive the expanded status reply message, the system further comprising an on-board processor of the lead locomotive programmed or configured to determine whether the respective status reply message from each of the two or more communication devices of a respective two or more remote locomotives has been received by the lead communication device.

Clause 20. The system according to any of clauses 15-19, wherein the determination is based at least partly on a number of status reply messages received by the lead communication device of the lead locomotive.

Clause 21. The system according to any of clauses 15-20, wherein the lead communication device is programmed or configured to return to a normal lead communication device transmit sequence if the lead communication device has received the respective status reply message from each of the two or more communication devices of a respective two or more remote locomotives and the expanded status reply message from the communication device of the at least one other remote locomotive.

Clause 22. The system according to any of clauses 15-21, wherein the on-board processor of the lead locomotive is further programmed or configured to: (i) determine that the lead communication device has not received the respective status reply message from at least one of the two or more communication devices of a respective two or more remote locomotives; and (ii) determine a communications status of at least one of the two or more communication devices of a respective two or more remote locomotives based at least partly on the current status reply count in the expanded status reply message.

Clause 23. The system according to any of clauses 15-22, wherein the on-board processor of the lead locomotive is programmed or configured to delay, for a period of time, before determining the communication status of the at least one of the two or more communication devices of a respective two or more remote locomotives.

Clause 24. The system according to any of clauses 15-23, wherein the on-board processor of the lead locomotive is programmed or configured to determine whether at least one of the two or more communication devices of a respective two or more remote locomotives has received the command message, and wherein the lead communication device is programmed or configured to transmit the command message until the on-board processor of the lead locomotive determines that each of the two or more communication devices of a respective two or more remote locomotives has received the command message.

Clause 25. The system according to any of clauses 15-24, wherein the on-board processor of the lead locomotive is programmed or configured to determine whether at least one of the two or more communication devices of a respective two or more remote locomotives has received the command message; and the lead communication device is programmed or configured to return to a normal lead communication transmit sequence when the on-board processor of the lead locomotive determines that each of the two or more communication devices of a respective two or more remote locomotives has received the command message.

Clause 26. The system according to any of clauses 15-25, wherein the communication device of the at least one other remote locomotive is programmed or configured to repeat the command message; and the on-board processor of the at least one other remote locomotive is programmed or configured to determine whether the received command message is the command message transmitted by the lead communication device or the command message has been repeated by a communication device of another remote locomotive.

Clause 27. The system according to any of clauses 15-26, wherein the on-board processor of the at least one other remote locomotive is programmed or configured to determine whether the received command message is a new command message or a previously received command message.

Clause 28. The system according to any of clause 15-27, wherein the on-board processor of the lead locomotive is programmed or configured to provide an output to an operator of the lead locomotive indicating one of the following: i) receipt of the command message by each of the two or more communication devices of a respective two or more remote locomotives is continued or ii) receipt of the command message by one or more of the two or more remote communication devices of a respective two or more remote locomotives cannot be confirmed.

Clause 29. The system of any of clauses 15-28, further comprising: an event recorder in at least one of the lead locomotive and the at least one other remote locomotive, wherein the event recorder is programmed or configured to store the current status reply count.

Clause 30. The system of any of clauses 15-29, wherein at least one of the on-board processor of the at least one other remote locomotive and an on-board processor of the lead locomotive is programmed or configured to determine a problem in a communication network of the train consist based on the current status reply count.

Clause 31. The system of any of clauses 15-30, wherein at least one of the on-board processor of the at least one other remote locomotive and an on-board processor of the lead locomotive is programmed or configured to determine a location of at least one of the at least one other remote locomotive and the lead locomotive based on the current status reply count These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which.

DETAILED DESCRIPTION OF THE PREFERRED EMBODIMENTS OR ASPECTS

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Figure 1:
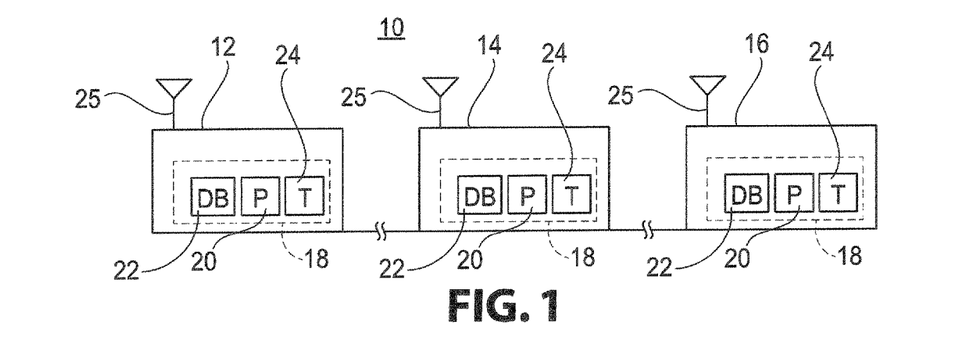
FIG. 1 is a schematic diagram of a portion of a train consist according to a preferred and non-limiting embodiment or aspect.

FIG. 1 is a schematic diagram of a portion of a train consist 10 with which preferred and non-limiting embodiments or aspects of the present invention may be implemented. By way of example, the train consist 10 may include a lead locomotive 12, a first remote locomotive 14, and a second remote locomotive 16. It should be understood that this configuration is used by way of example only and that the train consist 10 may include only one remote locomotive or it may include more than two remote locomotives. A plurality of railcars, not shown, may be situated between the locomotives. Each locomotive may include an on-board control system 18 (e.g., an on-board controller, on-board computer, a train management computer, a computing system, a computing device, a processor, and/or the like) that includes at least one on-board processor 20 (or processing unit) and at least one database 22, which processor 20 is programmed or configured to, for example, control and/or manage various systems or components on-board each locomotive and/or throughout the train consist 10. Each control system 18 may also include, control, or be in communication with certain combinations of communication devices 24, such as, but not limited to wireless communication devices, communication units, radio transmitters, receivers, and/or transceivers, programmed or configured for enabling wireless communication by and among the locomotives 12, 14, 16. One or more antennae 25 may be provided for each locomotive to operate with the radio systems, as is known in the art.

The processor 20 of the lead locomotive 12 may be programmed or configured to function as the controlling processor (or train management computer) of a distributed power communication scheme, such as one designed and implemented by the assignee of the present invention, Wabtec Corporation, and/or as described in U.S. Pat. No. 5,720,455, the entire contents of which are hereby incorporated by reference. The lead locomotive processor 20 may be configured for, among other things, transmitting command instructions within a command message to the remote locomotives 14 and 16. A command message may include command instructions to be executed, implemented, or acted upon by the remote locomotives 14, 16 in accordance or compliance with the distributed power communication scheme. Command instructions may include, but are not limited to: direct or indirect commands, direction commands, traction commands, dynamic braking commands, air brake commands, and/or any other commands relating to electrical and/or pneumatic functions of the train consist 10. For example, the command instruction may be a control instruction that the lead locomotive 12 transmits to at least one of the remote locomotives 14, 16.

The lead locomotive 12 may transmit to all or some of the remote locomotives 14, 16 periodically, e.g., about once every 10-30 seconds, if there are no command changes, and at other times be in a receive mode, i.e., listening for messages from the remote locomotives 14, 16. If a command change is determined, the lead locomotive 12 transmits the associated command change instructions substantially immediately within the limits of the protocol of the distributed power communication scheme. In one preferred and non-limiting embodiment or aspect, a minimum time between transmissions may be about once every 1-3 seconds, and in another embodiment or aspect, once every 4-6 seconds, and in a still further embodiment or aspect, once every 8-10 seconds.

When the lead locomotive 12 transmits a command message, the lead locomotive 12 expects a status reply message from each remote locomotive 14, 16 of the train consist 10 indicative of the actual functional status or condition of the respective remote locomotive 14, 16. If a status reply message is not received directly from all remote locomotives 14, 16, or if the lead locomotive 12 cannot otherwise determine the status of a remote locomotive 14, 16, the lead locomotive 12 may re-transmit the command message. If the status or condition of a remote locomotive 14, 16 is not determined in response to or based on the re-transmitted command message, the lead locomotive 12 may continue to transmit the command message periodically, e.g., about every 2-10 seconds, until the functional status of all of the remote locomotives 14, 16 is determined.

The processor 20 (or train management computer) of the remote locomotives 14, 16 may be programmed or configured to receive command messages from the lead locomotive 12, and transmit a respective remote status reply message in response thereto. The status reply message may contain data indicative of the respective transmitting remote locomotive's actual operational status or condition, and/or its correspondence, alignment, or conformance with instructions contained in the command message. For example, the status reply message of the remote locomotive 14, 16 may include data indicative of that respective remote locomotive's actual status related to at least one of the following: configurable settings, throttle settings, speed, direction, braking information, and/or air brake pressure information. Upon receipt of the status reply message by the lead locomotive 12, this information is used by the lead locomotive 12 to determine whether the respective remote locomotive 14, 16 is following the appropriate command instructions in the command message. A remote locomotive's status reply message may also include data indicative of, associated with, or related to additional status or condition information of the respective remote locomotive 14, 16. For example, this additional information may relate to the traction motor current and/or main reservoir pressure.

In one preferred and non-limiting embodiment or aspect, and to ensure that all remote locomotives receive a command message, the processor 20 of each remote locomotive 14, 16 may be programmed or configured to repeat all or a portion of the command message within a respective remote locomotive's status reply message. Accordingly, if a remote locomotive 14, 16, or any other remote locomotives within the train consist 10, cannot receive the command message directly from the lead locomotive 12, then that remote locomotive 14, 16 may instead receive the command message as part of another remote locomotive's status reply message (and act on or implement the repeated command message accordingly). This condition may occur when a remote locomotive 14, 16 is out of radio range with the lead locomotive 12.

In a preferred and non-limiting embodiment or aspect, remote locomotives 14, 16 within the train consist 10 transmit their respective reply messages within sequential time slots that may be determined by the distributed power communications scheme. For example, after receiving a command message directly from the lead locomotive 12, the first remote locomotive 14 may transmit a status reply message in a first time slot, while the second remote locomotive 16 may transmit its status reply message in a second time slot. Each respective status reply message may include a repeat of the command message. If a remote locomotive 14, 16 receives the command message from another remote locomotive's status reply message (instead of directly from the lead locomotive 12), then that remote locomotive 14, 16 may transmit its respective status reply message after all other remote locomotives 14, 16 have transmitted their respective status reply messages.

Figure 2:
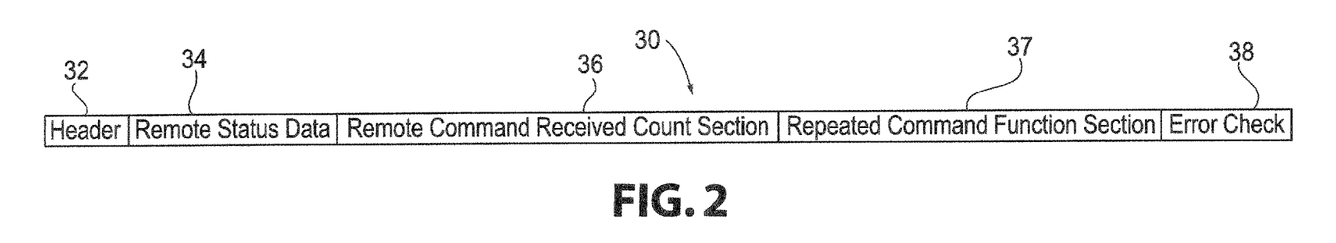
FIG. 2 is an example diagrammatic representation of a message structure including data indicative of a count according to a preferred and non-limiting embodiment or aspect.

FIG. 2 illustrates a diagrammatic representation of an example data structure of a remote status reply message 30, which includes a header portion 32, a remote status data portion 34, a remote command received count section 36, a repeated command function section or block 37, and an error check portion 38. The remote status data portion 34 may include data indicative of the respective locomotive's actual status, such as with respect to the commands received in a lead command message 40 (as discussed hereinafter). The remote command received count section 36 may include one or more bits whose value can be incremented in response to or based on receipt of a status reply message from another remote locomotive 14, 16.

For example, a train consist 10 with only two remote locomotives 14, 16 would require only a single bit remote command received count section 36. A train consist 10 with two, three, or four or more remote locomotives 14, 16 may use a two bit remote command received count section 36. The bits within the remote command received count section 36 may not individually indicate that a respective remote locomotive 14, 16 has received the command message and/or is following the command instructions in the command message 40. That is, the remote command received count section 36 does not require setting a respective bit for each remote locomotive 14, 16. Instead, the remote command received count section 36 represents a number of times that a status reply message 30 has been received from another remote locomotive 14, 16, without indicating the particular locomotives from which the status replies have been received. However, by using another data field, it is envisioned that the specific remote locomotive(s) from which the remote locomotive 14, 16 receives the status reply message can be identified, such as through some unique (e.g., numeric, alphanumeric, binary, etc.) identifier of the remote locomotive that transmits the status reply message. In one preferred and non-limiting embodiment or aspect, the repeated command function section 37 includes the command message 40 or a portion of the command message 40, such as the command instructions in the command message 40.

In another preferred and non-limiting embodiment or aspect, the remote locomotive 14, 16 receiving a status reply message 30 from another remote locomotive 14, 16 need not compare the received status reply message 30 to a stored command message 40 to determine whether another remote locomotive 14, 16 has received the command message 40, and/or is following the set of command instructions. Instead, the receipt of the status reply message 30, itself, is sufficient to cause the receiving remote locomotive 14, 16 to increment its count. Accordingly, and in this embodiment, extra processing at the remote locomotive 14, 16 is avoided.

Figure 3:
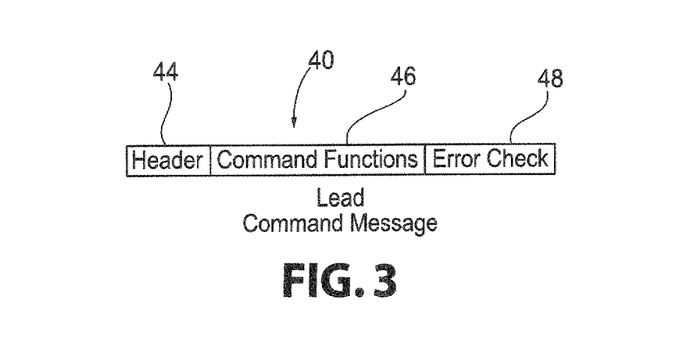
FIG. 3 illustrates example diagrammatic representations of a lead command message according to a preferred and non-limiting embodiment or aspect.

FIG. 3 illustrates an example structure of a lead command message 40. The lead command message 40 may include a header portion 44, a command functions portion 46, and an error check portion 48. The command functions portion 46 may include data indicative of the control instructions broadcast or transmitted by the lead locomotive 12 to the remote locomotives 14, 16. It will be recognized by those skilled in the art that the specific structures of the messages depicted in FIGS. 2 and 3 may vary to accomplish the same result.

Figure 4:
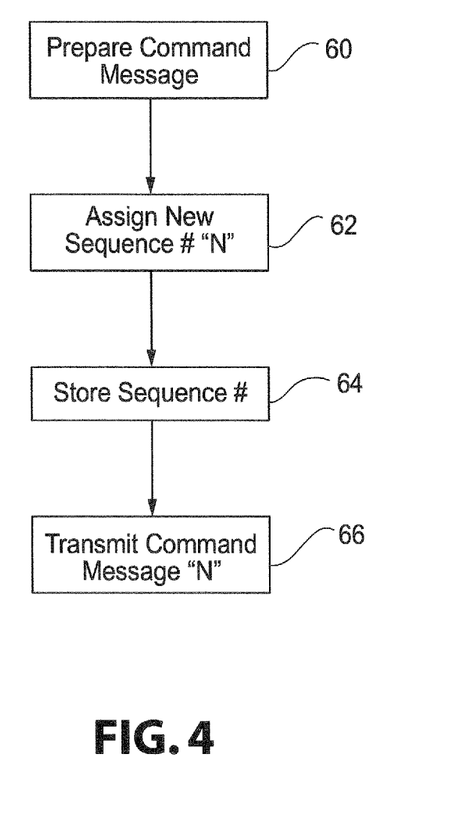
FIG. 4 is a flow chart showing a system and process for transmitting a lead command message according to a preferred and non-limiting embodiment or aspect.

FIG. 4 is a flow chart showing a system and process for transmitting a lead command message 40 according to a preferred and non-limiting embodiment or aspect. In step 60, the lead locomotive 12 prepares a command message "N" that may have a lead command message structure 40. A new sequence number "N" may be assigned to the command message in step 62. The sequence number "N" may be stored in the database 22 of the lead locomotive 12. Data indicative of the content of the associated command message 40, e.g., command message "N", may also be stored in database 22, by the lead locomotive 12, in step 64. The command message 40 may be generated or prepared using the on-board control system 18 (or on-board processor 20) of the lead locomotive 12 in conjunction with the distributed power communication scheme of the train consist 10. The lead locomotive 12 transmits or broadcasts the command message "N" in step 66.

Figure 5:
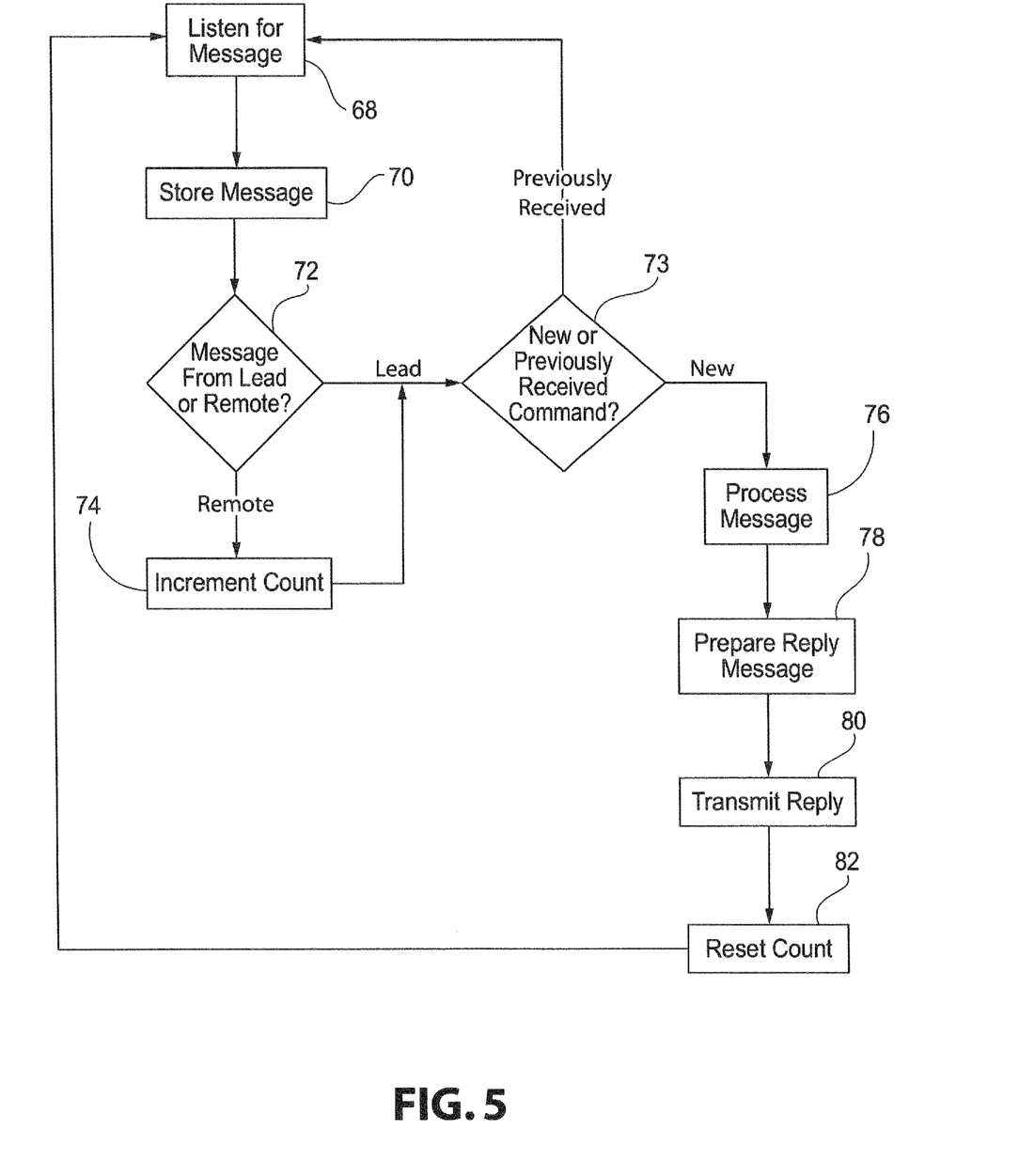
FIG. 5 is a flow chart showing a system and process for receiving a message at a remote unit according to a preferred and non-limiting embodiment or aspect.

FIG. 5 is a flow chart showing a system and process for receiving a message at a remote locomotive 14, 16 according to a preferred and non-limiting embodiment or aspect. In one exemplary aspect, a remote locomotive 14 waits to receive a message at step 68. For example, the command message "N" may be received directly by one or more remote locomotives 14, 16 in step 68. Instead of being received directly from the lead locomotive 12, step 68 also allows for one or more remote locomotives 14, 16 to receive the command message "N" by virtue of the command message "N" being repeated in the status reply message of another remote locomotive 14, 16, e.g., in the repeated command function section or block 37. The remote locomotive 14 may store data indicative of the content of the received command message 40 (or 37), including the sequence number "N" of the command section or block, in its onboard database 22, in step 70.

In step 72, the remote locomotive 14 determines whether the received message is (i) a lead command message 40 received directly from the lead locomotive 12 or (ii) another remote locomotive's status reply message 30 that is "repeating" a lead command message 40, e.g., in the repeated command function section 37. For example, the received message may indicate the locomotive from which it was directly sent, and the remote locomotive 14 may check the received message to determine the locomotive from which the received message was directly sent. If the received message is another remote locomotive's status reply message 30 that is "repeating" a lead command message 40, i.e., scenario (ii), the remote locomotive 14 increments its current count in step 74. After incrementing the count in step 74, processing proceeds to step 73 in which the remote locomotive 14 determines whether the received message contains a new lead command or if it contains a command that has previously been received. If the received message is a lead command message 40 received directly from the lead locomotive 12 in step 72, i.e., scenario (i), processing can proceed directly to step 73 in which the remote locomotive 14 determines whether the received message contains a new lead command or if it contains a command that has previously been received. For example, the remote locomotive 14 may check the sequence number "N" of the command function section or block in the received message against the last stored sequence number in its on-board database 22 to determine whether the received message contains a new lead command or a command that has been previously received. This test can be performed on all messages received by the remote locomotive 14, regardless of whether the message came from a lead locomotive 12 directly or was received from another remote locomotive 16. If the remote locomotive 14 determines in step 73 that the received message includes a command that has been previously received, processing can return to step 68 in which the remote locomotive 14 listens for further command messages 40 and status reply messages 30 broadcast by the lead locomotive 12 and other remote locomotives.

If, in step 73, the remote locomotive 14 determines that the received message includes a new command message, processing proceeds to step 76. The remote locomotive 14 processes the associated command instructions included in the command message "N" so that the remote locomotive 14 is set in the proper state of operation in step 76. In step 78, the remote locomotive 14 prepares a status reply message 30, which may contain data indicative of the actual status of remote locomotive 14 pertaining to command message "N" and the current count of the remote locomotive 14. The current count may be indicated by the field or section 36 in the message 30. In step 80, the remote locomotive 14 transmits the status reply message 30 to the lead locomotive 12. Step 80, therefore, allows for a remote locomotive to transmit back to the lead locomotive 12 in response to or based on its receipt and processing of a command message.

The current count, e.g., the count indicated by the field or section 36 in the message 30 transmitted by the remote locomotive 14, can be stored by an event recorder of the remote locomotive 14, by an event recorder of the lead locomotive 12, or by any combination thereof. The remote locomotive 14 and/or the lead locomotive 12 can analyze the count data for radio management purposes and to determine problem areas, e.g., communication errors, transmittal issues, corruption issues, and the like, in the railroad's radio communications network. For example, a remote locomotive that repeatedly loses communication with the lead locomotive, e.g., a number of communications losses for a period of time between the remote and lead locomotives exceeds a threshold, can be identified as a problem in the railroad's radio communications network. In another example, a location of the remote locomotive 14 and the lead locomotive 12 during a time period in which the current count was determined, which can be determined from Positive Train Control (PTC) systems and/or a transmission/reception time of the message 30 including the current count indicated by the field or section 36, can be associated with the current count to determine areas in the track network where remote communication between the remote locomotives 14, 16 and the lead locomotive 12 has been lost or failed. In some implementations, the count data can be used to determine a need for radio repeaters or other communications mitigation between specific locomotives in the train consist and/or at specific locations in the track network.

After transmitting the status reply message 30 in step 80, the remote locomotive 14 may reset its current count to zero at step 82, and processing may return to step 68 for the remote locomotive 14 to listen for further command messages 40 broadcast by the lead locomotive 12 and/or status reply messages 30 from the other remote locomotives.

Figure 6:
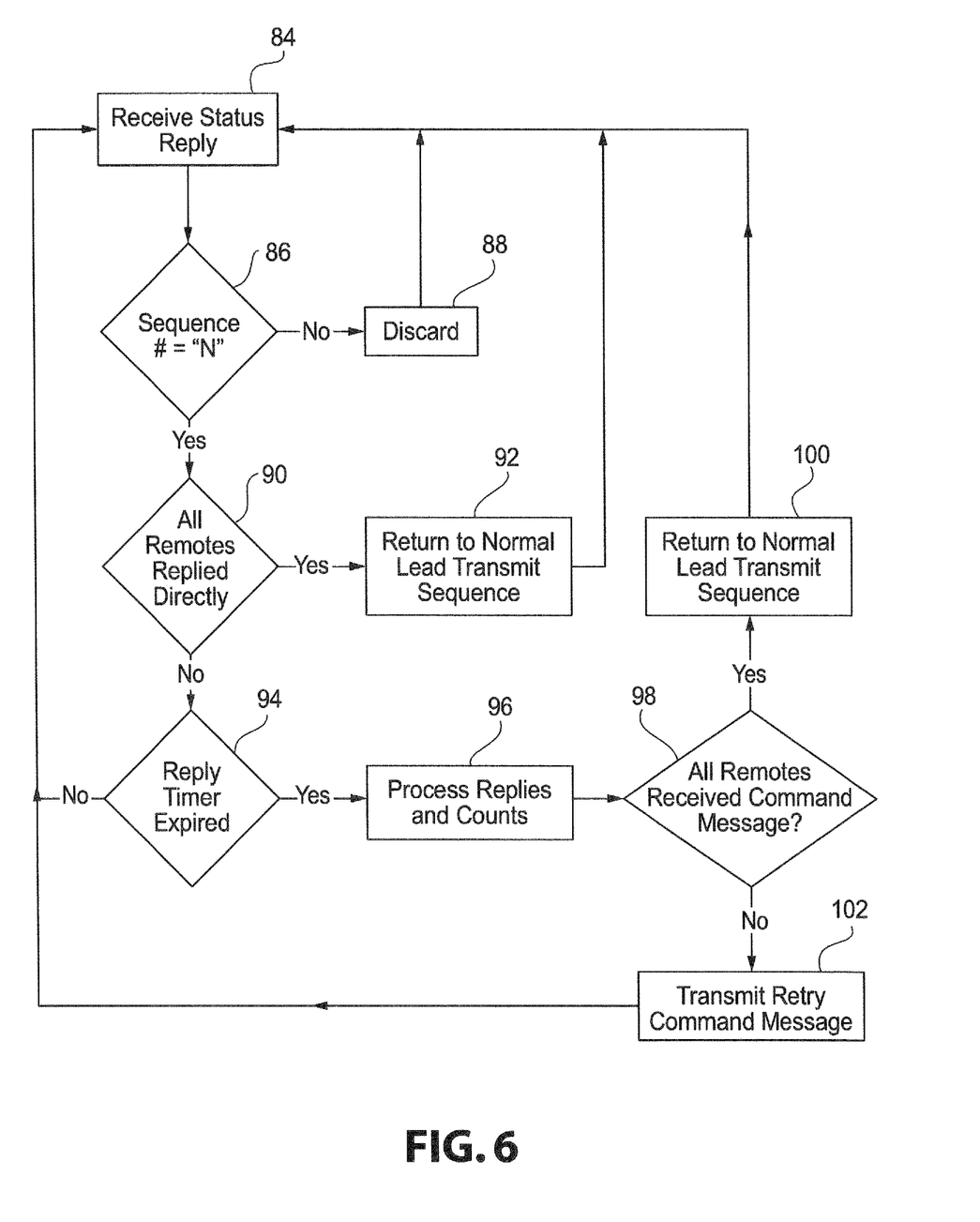
FIG. 6 is a flow chart showing a system and process for receiving remote status messages by a lead locomotive according to a preferred and non-limiting embodiment or aspect.

FIG. 6 is a flow chart showing a system and process for receiving remote status reply messages 40 by a lead locomotive 12 according to a preferred and non-limiting embodiment or aspect. In step 84, the lead locomotive 12 may receive a remote locomotive's status reply message 30. The on-board processor 20 of the lead locomotive 12 may determine, in step 86, whether the sequence number of the command section or block in the received message equals the sequence number "N" for a current command message 40 stored on-board the lead locomotive 12. If the sequence numbers are not equal, the lead locomotive 12 may discard the received message in step 88, and processing returns to step 84 for the lead locomotive 12 to listen for further status reply messages 30.

If the sequence numbers match, the on-board processor 20 of the lead locomotive 12 determines, in step 90, whether all remote locomotives within the train consist 10 have now replied directly to the lead locomotive 12 with their respective command functions status. For example, the on-board processor 20 of the lead locomotive 12 may determine if all the remote locomotives 14, 16 within the train consist 10 have now replied directly to the lead locomotive 12 with their respective command function status within a first reply period. the lead locomotive may determine if all of the remote locomotives 14, 16 within the train consist have now replied directly to the lead locomotive 12 based on a number of status reply messages received by the lead communication device of the lead locomotive and/or a number of remote locomotives or a number of status reply messages expected to be received. If all the remote locomotives 14, 16 within the train consist 10 have replied directly to the lead locomotive 12, the lead locomotive 12 returns the communication device 24, in step 92, to its normal lead transmit sequence, which may be defined by the protocol of the distributed power communications scheme operable among the locomotives 12, 14, 16 within the train consist 10. In some implementations, the lead locomotive 12 provides an output to an operator of the lead locomotive 12, e.g., via a driver display screen, a visual display unit, in the form of an audible alert, and/or the like, that receipt of a most recent command message by all remote locomotives is confirmed, or that receipt of the most recent command message by one or more of the remote locomotives cannot be confirmed.

If all remote locomotives 14, 16 have not replied directly to the lead locomotive 12 in step 86, the on-board processor 20 of the lead locomotive 12 determines, in step 94, whether a reply timer has expired. The reply timer may be established as part of the distributed power communications scheme. If the reply timer has not expired, then the lead locomotive 12 may return to step 84, wherein the communication device 24 of the lead locomotive 12 continues listening for status reply messages 30. If the reply timer has expired, the on-board processor 20 of the lead locomotive 12 checks and processes, in step 96, the remote command received count section 36 contained in each status reply message 30, to determine whether the lead locomotive 12 has received the status reply message 30 directly from each respective remote locomotive 14, 16 in the train consist 10.

Each received status reply message 30, and each received remote command received count section 36 of each received status reply message 30, are processed in step 96 by the on-board processor 20 of the lead locomotive 12 to determine which of the remote locomotives 14, 16 have received the command message 40, either directly or indirectly. Each status reply message 30 including the section 36 may be decoded by a respective on-board processor 20 (of the on-board control system 18) of the lead locomotive 12 to determine whether the remote locomotives 14, 16 have received the command message 40 and/or are following the command message instructions.

After processing each received status reply message 30 and each received remote command received count section 36 of each received status reply message 30, the on-board processor 20 of the lead locomotive 12, in step 98, determines whether all remote locomotives 14, 16 within the train consist 10 have received the command message 40 and/or are following the instructions contained within the command message 40. If it is determined that all remote locomotives 14, 16 have received the command message 40, the lead locomotive 12 returns the communication device 24 to its normal lead transmit sequence in step 100, which may be defined in the protocol of the distributed power communications scheme.

A remote locomotive 14, 16 may be considered to have received the command message 40 if the lead locomotive 12 receives a status reply message 30 directly from that remote locomotive 14, 16, or if processing of the received status reply messages 30 and the remote command received count section 36 of each received status reply message 30 at the lead locomotive 12, determines that each remote locomotive 14, 16 received and/or processed the command message 40. If the on-board processor 20 of the lead locomotive 12 determines that that all remote locomotives 14, 16 within the train consist 10 have received the command message 40 and/or are following the instructions contained within the command message 40, the lead locomotive 12 may lessen the severity of its response to a one-way communication loss with a remote locomotive 14, 16 to a level that is less than its current response to a two-way loss of communications. For example, the lead locomotive 12 may lessen the severity of its response by not generating extra radio message queries, employing longer delays before applying operating restrictions, showing a one-way communications loss indication on the crew display, adding entries to an internal log, and/or not stopping or slowing the train.

If the on-board processor of the lead locomotive 12 determines, in step 98, that one or more remote locomotives 14, 16 have not received the command message 40, the communication device 24 of the lead locomotive 12 may transmit or broadcast a retry command message, re-transmits or re-broadcasts, or takes other restrictive measures to respond to the determined two-way communications loss, in step 102. A retry command message (or the command message 40) may be broadcast with minimal time delay, such as about once every 2-4 seconds, for example. A communication loss or interruption warning or alarm condition may be activated by the on-board processor 20 of the lead locomotive 12 if it does not receive a command functions status message (or portion) 46 regarding each remote locomotive 14, 16 within a predetermined period of time. This period may vary depending on the criticality of the command functions broadcast to the remote locomotives 14, 16. All of the remote locomotives 14, 16 may be declared to be following the command instructions if all of the remote locomotives 14, 16 have received the command message 40.

The presently-invented railroad distributed power remote communication status system and method, according to a preferred and non-limiting embodiment or aspect, can be effectively implemented for identifying a missed reply in a two-remote locomotive configuration, i.e., in a configuration with a lead locomotive and only two remote locomotives. Specifically, the count in a scenario with only two remote locomotives would be either "0" or "1" to indicate whether the responding remote locomotive received a status reply message from the other remote locomotive. The lead locomotive (e.g., in step 98) can effectively determine, based on the responding remote locomotive's status reply, whether all remote locomotives within the train consist have received the command message and/or are following the instructions contained within the command message.

Alternatively, in a scenario of a remote locomotive counting scheme according to a preferred and non-limiting embodiment or aspect where the train consist includes three or more remote locomotives, e.g., remote locomotive (A), remote locomotive (B), and remote locomotive (C), two of the three remote locomotive's status reply messages are not received by the lead locomotive, and the remote locomotive (A) only receives a response from one of the remote locomotives (B) or (C), the lead locomotive may not be able to determine which of the two or more remote locomotives (B) and (C) did not receive the lead locomotive command message in response to or based on a status reply message from remote unit (A) including a count of one (unless some other indication field is included in the status reply message, as discussed above). In particular, and in this embodiment or aspect with a specified status reply message, the on-board processor of the lead locomotive cannot determine which of the remote locomotives (B) or (C) is in a two-way communications loss, i.e., which remote locomotive did not receive the command message in the first place, and which of the remote locomotives (B) or (C) is in a one-way communications loss, i.e., which remote locomotive received the command message. However, the on-board processor of the lead locomotive is still able to determine that a two-way communications loss exists. In such a situation, the system and method may include, e.g., at step 98, a determination that all remote locomotives have not received the command message, and that the lead locomotive should transmit or broadcast a retry command message (or re-transmit or re-broadcast the command message), e.g., at step 100.

However, and with continued reference to this embodiment or aspect, if the lead locomotive receives a status reply message from two of the three remote units e.g., remote locomotives (A) and (B), the lead locomotive may determine, by process of elimination, which of the three remote locomotives, i.e., remote locomotive (C) in this example, did not receive the lead command message. The lead locomotive may then use the count sections, e.g., field or section 36 of the status reply message, from each of the remote locomotives (A) and (B) to determine whether the remote locomotive (C) received the lead command message, as long as the count of one of the remote locomotives (A) and (B) is at least two. However, it is envisioned that a scenario may arise where the count of each of the replying remote locomotives (A) and (B) is one, in which case the lead locomotive will be unable to determine whether the remote locomotive (C) received the lead command message. That is, remote locomotives (A) and (B) may have incremented each other's counts. In such a situation, the system and method may include, e.g., at step 98, a determination that all remote locomotives have not received the command message, and that the lead locomotive should transmit or broadcast a retry command message (or re-transmit or re-broadcast the command message), e.g., at step 100. Alternatively, if the lead locomotive receives a status reply message from only one of the three remote locomotives, e.g., remote locomotive (A), that includes a count of two, the on-board processor of the lead locomotive may determine that each of the other remote locomotives (B) and (C) have received the command message and, thus, are in only a one-way communications loss.

Processing at the lead locomotive for a train having more than three remote units is not discussed in detail in the interest of brevity; however, the skilled artisan would readily recognize that the processing at the lead locomotive may be extrapolated to a train consist having more than three remote locomotives, in which the status of the remote locomotives is determined by process of elimination based on each received status reply message, which indicates a particular remote locomotive sending the message, and its respective count as discussed above.

Preferred and non-limiting embodiments or aspects allow for a lead communication device 24, e.g., a lead transceiver unit, of a lead locomotive 12 to function interoperably with a communication device 24, e.g., a transceiver unit, of a remote locomotive 14, 16, to execute distributed power communication functions for implementing aspects of the present invention. The respective on-board control systems 18 (e.g., the on-board processor 20) may be programmed or configured to allow for the lead communication device 24 to determine which (remote) communication devices 24 from among a plurality of (remote) communication devices 24 located at spaced locations along the train consist 10 are in receipt of a command message 40 and/or are executing instructions associated with command functions of the command message 40. One exemplary embodiment or aspect allows for the respective on-board control systems 18 (e.g., the on-board processors 20) and/or the communication devices 24, to be programmed or configured, such that when the lead communication 24 determines that a respective (remote) communication 24 is in receipt of a command message 40 that an associated remote locomotive 14, 16 is following the command functions of the command message 40.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A computer-implemented method for determining at a lead locomotive in a train consist a communications status of at least one remote locomotive of a plurality of remote locomotives of the train consist, the method comprising:
  (a) transmitting, by a lead communication device of the lead locomotive, a command message;
  (b) receiving, by a plurality of communication devices of a respective plurality of remote locomotives, the command message;
  (c) transmitting, by a communication device of at least one remote locomotive of the plurality of remote locomotives, a status reply message in response to receipt of the command message, wherein at least a portion of the command message is repeated within the status reply message;
  (d) receiving, by a communication device of at least one other remote locomotive of the plurality of remote locomotives, the status reply message including the repeated at least a portion of the command message;
  (e) incrementing, at the at least one other remote locomotive of the plurality of remote locomotives, a current status reply count in response to the receipt of the status reply message including the repeated at least a portion of the command message from the at least one remote locomotive of the plurality of remote locomotives; and
  (f) transmitting, by the communication device of the at least one other remote locomotive of the plurality of remote locomotives, an expanded status reply message including the current status reply count to the lead communication device of the lead locomotive;

(g) receiving, by the lead communication device of the lead locomotive, the expanded status reply message;

(h) determining, by an on-board processor of the lead locomotive, a communications status of a communication device of the at least one remote locomotive with respect to the command message, based at least partly on the current status reply count in the expanded status reply message received from the at least one other remote locomotive; and (i) controlling, by the on-board processor of the lead locomotive, at least one of a throttle and a brake of the train consist based on the determined communications status of the communication device of the at least one remote locomotive with respect to the command message.

2. The method according to claim 1, further comprising two or more communication devices of a respective two or more remote locomotives, the method further comprising:

receiving, by the two or more communication devices of a respective two or more remote locomotives, the command message;

transmitting, by the two or more communication devices of a respective two or more remote locomotives, a respective status reply message;

receiving, by the communication device of the at least one other remote locomotive, each respective status reply message; and incrementing, at the at least one other remote locomotive, the current status reply count based on each respective status reply message.

3. The method according to claim 2, further comprising:

receiving, by the lead communication device, the expanded status reply message; and determining, by an on-board processor of the lead locomotive, whether the respective status reply message from each of the two or more communication devices of a respective two or more remote locomotives has been received by the lead communication device.

4. The method according to claim 3, wherein the determination is based at least partly on a number of status reply messages received by the lead communication device of the lead locomotive.

5. The method according to claim 3, further comprising:

confirming, by the lead communication device, receipt of the command message by each remote locomotive of the plurality of remote locomotives if the lead communication device has received the respective status reply message from each of the two or more communication devices of a respective two or more remote locomotives and the expanded status reply message from the communication device of the at least one other remote locomotive; and controlling, by the on-board processor of the lead locomotive, the at least one of the throttle and the brake of the train consist in response to the confirmed receipt of the command message by each remote locomotive of the plurality of remote locomotives, wherein the on-board processor of the lead locomotive controls the at least one of the throttle and the brake of the train consist in a less restrictive manner in response to the confirmed receipt of the command message by each remote locomotive of the plurality of remote locomotives than in response to a determination that one or more of the plurality of remote locomotives has not received the command message.

6. The method according to claim 3, further comprising:

(i) determining, by the on-board processor of the lead locomotive, that the lead communication device has not received the respective status reply message directly from at least one of the two or more communication devices of a respective two or more remote locomotives; and (ii) determining, by the on-board processor of the lead locomotive, a communications status of at least one of the two or more communication devices of a respective two or more remote locomotives based at least partly on the current status reply count in the expanded status reply message.

7. The method according to claim 6, further comprising delaying, for a period of time, before determining the communication status of the at least one of the two or more communication devices of a respective two or more remote locomotives.

8. The method according to claim 7, further comprising:

determining, by the on-board processor of the lead locomotive, whether the at least one of the two or more communication devices of a respective two or more remote locomotives has received the command message; and transmitting, by the lead communication device, the command message until the on-board processor of the lead locomotive determines that each of the two or more communication devices of a respective two or more remote locomotives has received the command message.

9. The method according to claim 7, further comprising:

determining, by the on-board processor of the lead locomotive, whether the at least one of the two or more communication devices of a respective two or more remote locomotives has received the command message; and returning to a normal lead communication transmit sequence when the on-board processor of the lead locomotive determines that each of the two or more communication devices of a respective two or more remote locomotives has received the command message.

10. The method according to claim 7, further comprising:

determining, by the on-board processor of the lead locomotive, whether the at least one of the two or more communication devices of a respective two or more remote locomotives has not received the command message; and generating or providing, by the on-board processor of the lead locomotive, an output to an operator of the lead locomotive indicating one of the following: i) receipt of the command message by each of the two or more communication devices of a respective two or more remote locomotives is confirmed or ii) receipt of the command message by one or more of the two or more remote communication devices of a respective two or more remote locomotives cannot be confirmed.

11. The method according to claim 1, further comprising:

repeating, by the communication device of the at least one other remote locomotive, the command message; and determining, by an on-board processor of the at least one other remote locomotive, whether the received command message is the command message transmitted by the lead communication device or the command message has been repeated by a communication device of another remote locomotive.

12. The method according to claim 11, further comprising:
  determining, by the on-board processor of the at least one other remote locomotive, whether the received command message is a new command message or a previously received command message.

13. A system for determining, at a lead locomotive in a train consist, a communications status of at least one remote locomotive of the train consist, the system comprising:
  a lead communication device of the lead locomotive programmed or configured to transmit a command message;
  a communication device of at least one remote locomotive of a plurality of remote locomotives programmed or configured to receive the command message and transmit a status reply message in response to receipt of the command message, wherein at least a portion of the command message is repeated within the status reply message;
  a communication device of at least one other remote locomotive of the plurality of remote locomotives programmed or configured to receive the status reply message including the repeated at least a portion of the command message; and
  an on-board processor of the at least one other remote locomotive of the plurality of remote locomotives programmed or configured to increment a current status reply count in response to the receipt of the status reply message including the repeated at least a portion of the command message from the at least one remote locomotive of the plurality of remote locomotives;
  wherein the communication device of the at least one other remote locomotive of the plurality of remote locomotives is programmed or configured to transmit an expanded status reply message including the current status reply count to the lead communication device of the lead locomotive,
  wherein the lead communication device of the lead locomotive is programmed or configured to receive the expanded status reply message, the system further comprising an on-board processor of the lead locomotive programmed or configured to determine a communications status of a communication device of the at least one remote locomotive with respect to the command message, based at least partly on the current status reply count in the expanded status reply message,
  wherein the on-board processor of the lead locomotive is further programmed or configured to control at least one of a throttle and a brake of the train consist based on the communications status of the communication device of the at least one remote locomotive with respect to the command message.

14. The system according to claim 13, further comprising two or more communication devices of a respective two or more remote locomotives programmed or configured to receive the command message and transmit a respective status reply message; wherein the communication device of the at least one other remote locomotive is programmed or configured to receive each respective status reply message; and wherein the on-board processor of the at least one other remote locomotive is programmed or configured to increment the current status reply count based on each respective status replay message.

15. The system according to claim 14, wherein the lead communication device of the lead locomotive is programmed or configured to receive the expanded status reply message, the system further comprising an on-board processor of the lead locomotive programmed or configured to determine whether the respective status reply message from each of the two or more communication devices of a respective two or more remote locomotives has been received by the lead communication device.

16. The system according to claim 15, wherein the determination is based at least partly on a number of status reply messages received by the lead communication device of the lead locomotive.

17. The system according to claim 15, wherein the lead communication device is programmed or configured to confirm receipt of the command message by each remote locomotive of the plurality of remote locomotives if the lead communication device has received the respective status reply message from each of the two or more communication devices of a respective two or more remote locomotives and the expanded status reply message from the communication device of the at least one other remote locomotive, and
  wherein the on-board processor of the lead locomotive is programmed or configured to control the at least one of the throttle and the brake of the train consist in response to the confirmed receipt of the command message by each remote locomotive of the plurality of remote locomotives, wherein the on-board processor of the lead locomotive controls the at least one of the throttle and the brake of the train consist in a less restrictive manner in response to the confirmed receipt of the command message by each remote locomotive of the plurality of remote locomotives than in response to a determination that one or more of the plurality of remote locomotives has not received the command message.

18. The system according to claim 15, wherein the on-board processor of the lead locomotive is further programmed or configured to:
  (i) determine that the lead communication device has not received the respective status reply message from at least one of the two or more communication devices of a respective two or more remote locomotives; and
  (ii) determine a communications status of at least one of the two or more communication devices of a respective two or more remote locomotives based at least partly on the current status reply count in the expanded status reply message.

19. The system according to claim 18, wherein the on-board processor of the lead locomotive is programmed or configured to delay, for a period of time, before determining the communication status of the at least one of the two or more communication devices of a respective two or more remote locomotives.

20. The system according to claim 19, wherein the on-board processor of the lead locomotive is programmed or configured to determine whether at least one of the two or more communication devices of a respective two or more remote locomotives has received the command message, and wherein the lead communication device is programmed or configured to transmit the command message until the on-board processor of the lead locomotive determines that each of the two or more communication devices of a respective two or more remote locomotives has received the command message.

21. The system according to claim 19, wherein the on-board processor of the lead locomotive is programmed or configured to determine whether at least one of the two or more communication devices of a respective two or more remote locomotives has received the command message, and the lead communication device is programmed or configured to return to a normal lead communication transmit sequence when the on-board processor of the lead locomotive determines that each of the two or more communication devices of a respective two or more remote locomotives has received the command message.

22. The system according to claim 21, wherein the communication device of the at least one other remote locomotive is programmed or configured to repeat the command message, and the on-board processor of the at least one other remote locomotive is programmed or configured to determine whether the received command message is the command message transmitted by the lead communication device or the command message has been repeated by a communication device of another remote locomotive.

23. The system according to claim 22, wherein the on-board processor of the at least one other remote locomotive is programmed or configured to determine whether the received command message is a new command message or a previously received command message.

24. The system according to claim 19, wherein the on-board processor of the lead locomotive is programmed or configured to provide an output to an operator of the lead locomotive indicating one of the following: i) receipt of the command message by each of the two or more communication devices of a respective two or more remote locomotives is confirmed or ii) receipt of the command message by one or more of the two or more remote communication devices of a respective two or more remote locomotives cannot be confirmed.

25. The system of claim 13, further comprising an event recorder in at least one of the lead locomotive and the at least one other remote locomotive, wherein the event recorder is programmed or configured to store the current status reply count.

26. The system of claim 13, wherein at least one of the on-board processor of the at least one other remote locomotive and an on-board processor of the lead locomotive is programmed or configured to determine a problem in a communication network of the train consist based on the current status reply count.

27. The system of claim 13, wherein at least one of the on-board processor of the at least one other remote locomotive and an on-board processor of the lead locomotive is programmed or configured to determine a location of at least one of the at least one other remote locomotive and the lead locomotive based on the current status reply count.

* * * * *